United States Patent [19]
Story

[11] 3,714,624
[45] Jan. 30, 1973

[54] DISPLAY SYSTEM
[75] Inventor: Anne W. Story, Cambridge, Mass.
[73] Assignee: The United States of America as represented by the Administrator of the National Aeronautics and Space Administration
[22] Filed: July 16, 1970
[21] Appl. No.: 55,535

[52] U.S. Cl. ..............................................340/27 R
[51] Int. Cl. ...............................................G08g 5/00
[58] Field of Search.......340/27, 26, 324 A, 316, 366 CA, 340/366 D, 325, 373, 379; 235/150.2, 166; 73/178; 178/DIG. 20

[56] References Cited

UNITED STATES PATENTS

| | | | |
|---|---|---|---|
| 3,117,312 | 1/1964 | Watson | 340/27 R |
| 3,529,283 | 9/1970 | Emerson et al. | 340/27 NA |
| 2,991,743 | 7/1961 | Ogle | 340/26 |
| 2,463,529 | 3/1949 | Ferrill, Jr. | 73/178 |
| 3,258,743 | 6/1966 | Schuster | 340/27 |
| 3,594,757 | 7/1971 | Gard | 340/324 A |

Primary Examiner—Ralph D. Blakeslee
Assistant Examiner—Thomas L. Kundert
Attorney—Herbert E. Farmer and John R. Manning

[57] ABSTRACT

A situational display and a means for creating the display are disclosed. The display comprises a moving line or raster, on a cathode ray tube, which is disposed intermediate of two columns of lamps or intensifications on the cathode ray tube; the raster and lights to either side thereof being controlled in such a manner that pairs of lights define a line which is either tracked or "chased" by the raster in accordance with the relationship between the optimum and actual values of a monitored parameter.

4 Claims, 4 Drawing Figures

Patented Jan. 30, 1973
3,714,624
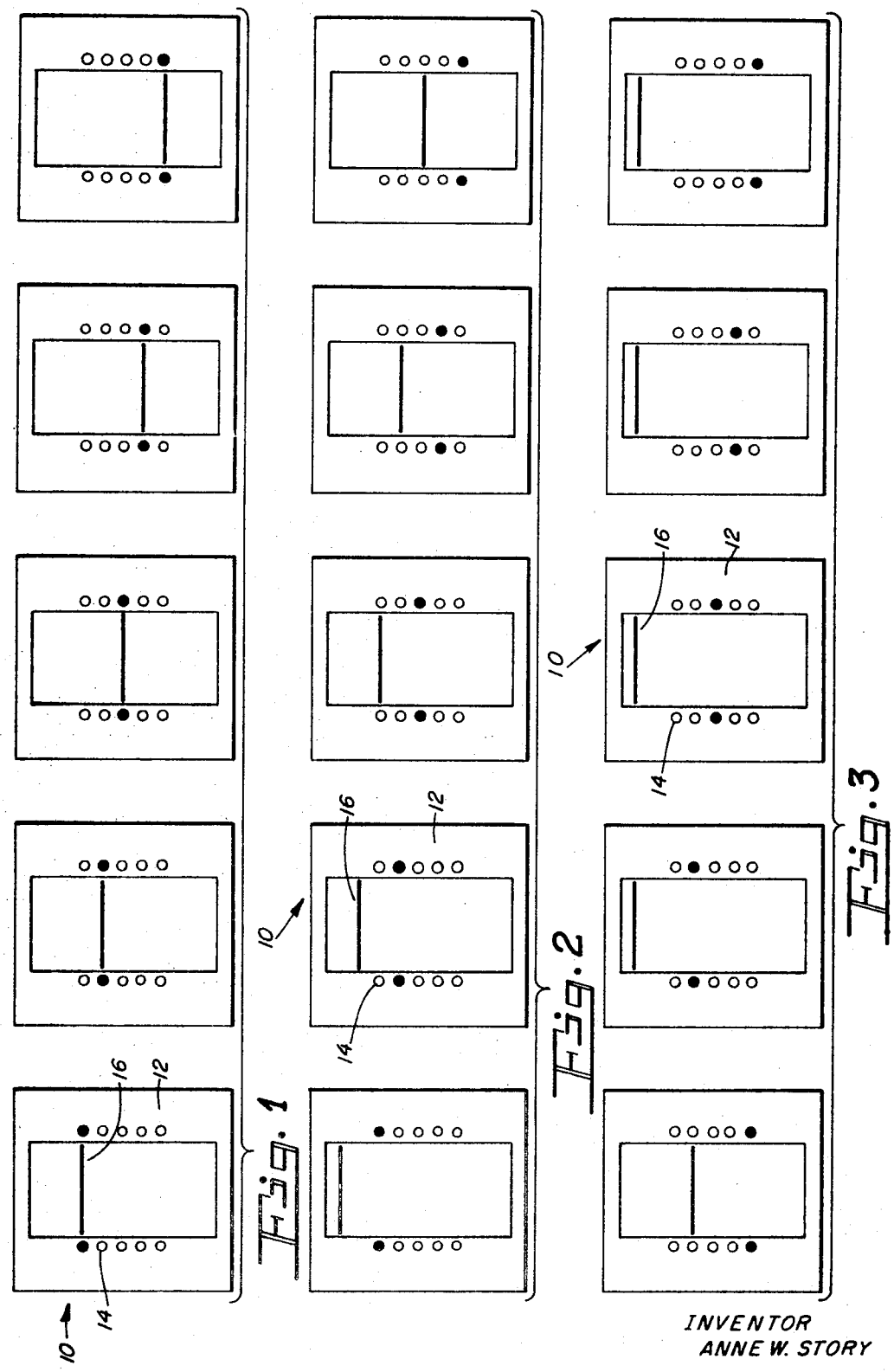
INVENTOR
ANNE W. STORY
BY Herbert E. Farmer
Attorney

INVENTOR
ANNE W. STORY

DISPLAY SYSTEM

ORIGIN OF THE INVENTION

The invention described herein was made by an employee of the United States Government and may be manufactured and used by or for the Government of the United State of America for governmental purposes without the payment of any royalties thereon or therefor.

BACKGROUND OF THE INVENTION

1. Field of the Invention

The present invention relates to the communication of intelligence to an observer by visual means. More specifically, this invention comprises apparatus for displaying discrepancies from an optimal condition of a controlled apparatus to the operator of that apparatus. Accordingly, the general objects of the present invention are to provide novel and improved methods and apparatus of such character.

2. Description of the Prior Art

While not limited thereto in its utility, the present invention has been found to be particularly useful in an aircraft environment for displaying discrepancies from optimal in flight speed, yaw, or pitch to a pilot. As will be discussed briefly below, instruments which have provided this information have previously been proposed and, in some cases, reduced to practice. The previous display methods have comprised instruments using arrows, pointers, needles or a single array of moving lights to indicate required corrections.

A major problem in the design of displays for aircraft control purposes concerns the relative efficacy of situation versus command information. Thus, in designing a display for a moving vehicle, it is necessary first to resolve the question as to whether or not there is time to show a pilot his situation or to obliterate the situation display in favor of the presentation of an immediate direction for a motor response. Experience has shown that most pilots demand knowledge of their position in the surrounding air space both with respect to the terrain and other aircraft or collision objects. Nevertheless, particularly with high-speed jet aircraft, in emergency situations evasive maneuvers must be executed so quickly and so accurately that the pilot cannot maintain surveillance of his environment, detect all relevant input data displayed on his instruments, sort through the alternative courses of control action, evaluate the respective outcomes of the various actions, and choose and carry out the optimum course of action. Thus, especially in emergency situations, command displays have been found invaluable.

The immediately obvious solution to the problem discussed above would appear to be the juxtapositioning of situation and command information. Such combined displays may, however, result in ambiguity whereby misinterpretation may occur under pilot stress. Accordingly, display systems wherein situation and command data have been combined have largely been discarded.

Another solution to the above-discussed problem resides in the switching from a situation to a command display in emergency situations where immediate action is required from the pilot. It has been found, however, that the trained pilot tends to follow habitual behaviors at such times and thus may continue to see a display as situational rather than as indicating a command. Accordingly, the switching of a display between operational modes has been deemed inadvisable.

Another resolution of the problem under discussion consists in the use of command displays only. As noted above, pilots have universely rejected command displays and have indicated a strong preference for situational displays. This rejection, in part, is a result of the feeling that the use solely of command displays relegates the pilot to the status of a mechanical autopilot. Further, it has been found that a pilot unable to perceive the actual situation is usually hesitant to carry out computerized commands.

A further resolution of the problem of situational versus command displays resides in the use solely of situational displays which are so basic that they will result in or allow only one responsive act. Such situational displays obviously cannot be mere copies or simplifications of the real world. Simple correspondence with reality would necessitate that the pilot evaluate a series of outcomes of possible courses of action. On the other hand, the simplified situational display must provide such direct clues to the pilot that only one behavioral sequence can eventuate from the perceptual input. In short, the optimum display system is a "situational" display which becomes tantamount to a "command" display. Previously display systems have not had this characteristic.

SUMMARY OF THE INVENTION

The present invention overcomes the above-discussed and other problems by providing a novel technique and apparatus for providing a situational display that presents unambiguous situational information which commands immediate response. In achieving the foregoing, the present invention presents critical real variables in accentuated form as displayed clues to a necessary directional course of action. Thus, in accordance with this invention, true situational information is displayed in such a manner that a pilot or operator perceiving the display will respond directly to discrepancies on the display.

In a preferred embodiment of the present invention, two columns of lights, which may either be separate lamps or intensifications on a cathode ray tube, are established on either side of an intermediate display which will typically be itself a cathode ray tube. Through the use of suitable logic circuitry, the lights comprising the two columns are illuminated in sequence, top to bottom, in accordance with the optimum computed value of a monitored vehicle parameter. The horizontal rasters on the cathode ray tube, also through the use of appropriate logic circuitry, will be swept from top to bottom of the tube in accordance with the discrepancy between the optimum and actual values of the monitored parameter. Accordingly, when no control action is required, the horizontal rasters will intensify sequentially at the same horizontal level as the side indicators. Any discrepancy in the relative movement of the side lights and the cathode ray tube raster will signify a need for corrective action with the magnitude of the discrepancy in the tracking of the side lights by the raster increasing as the requirement for corrective control increases.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which:

FIGS. 1, 2 and 3 depict a display in accordance with the present invention; each figure showing the display in five states and each figure representing a different relationship between the actual and optimum values of a monitored parameter.

DESCRIPTION OF THE PREFERRED EMBODIMENTS

Figure 4:
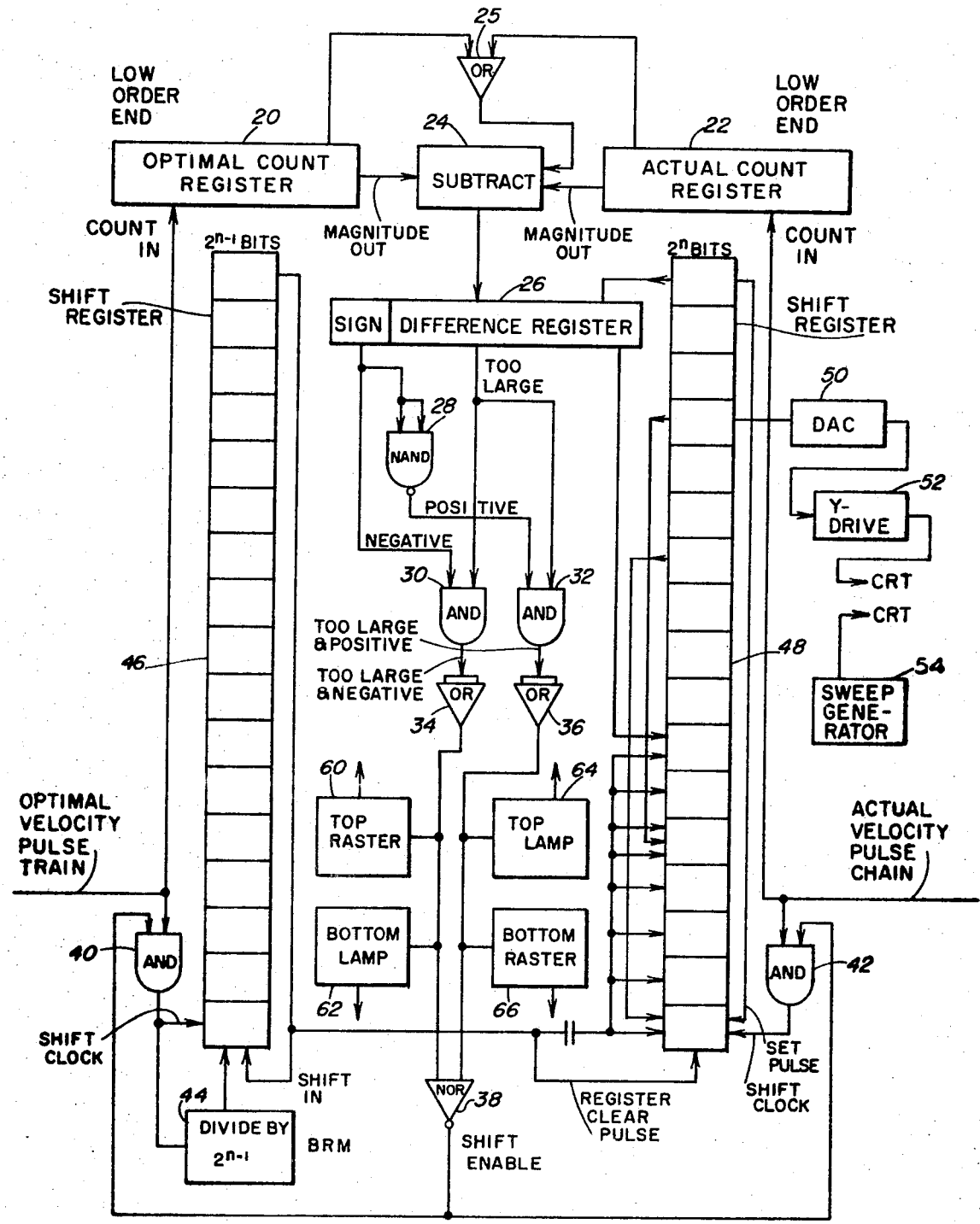
FIG. 4 is a block diagram of a preferred embodiment of logic circuitry which may be employed to control the display of FIGS. 1–3.

With reference now to the drawing, FIGS. 1–3 represent the face or operator's view of a visual display system in accordance with the present invention. As noted above, the entire display may be created on a high resolution cathode ray tube. However, to facilitate understanding of the invention, the display of FIGS. 1–3 comprises a panel, indicated generally at 10, having suitable apertures which permit observation of parallel, vertically oriented light banks 12 and 14; each of light banks 12 and 14 comprising an equal number of individual lamps. In addition, panel 10 has an aperture which registers with the face of a cathode ray tube 16; the face of the CRT being disposed between the vertical banks of lamps.

Through the action of the control circuitry to be described below in the discussion of FIG. 4, the lamps comprising the vertical arrays 12 and 14 are sequentially energized with the two lamps at either side of the display in the same horizontal plane being illuminated simultaneously. The speed at which the illuminated reference level, as defined by the pairs of horizontally aligned lamps, moves will be a function of the optimum or commanded value of the parameter being monitored. The cathode ray tube positioned between the vertical lamp arrays is programmed whereby horizontal lines will be displayed on the face of the CRT in the planes defined by the pairs of horizontally aligned lamps. Additionally, it has been found desirable to establish a display wherein the raster lines on the CRT may extend both above and below the ends of the vertical lamp columns. The speed at which the horizontal lines generated on the CRT move from the top to the bottom of the tube will be a function of the computed difference between the actual value of the monitored parameter and optimal value of the parameter. Accordingly, as will be described in more detail below, when the horizontal lines on the CRT fail to track the indicators on each side of the display, an operator or observer will immediately perceive both the existance of the discrepancy and the type of action required to null the error represented thereby whereby the "tracking" condition on the display will be restored.

FIG. 1 indicates the condition where no change in control is required. Thus, it may be seen in FIG. 1 that the horizontal rasters on the CRT 16 intensify sequentially at the same horizontal level as the side indicators 12 and 14. Since there are no discrepancies in the tracking of lights by the CRT raster, those rasters above and below the lights at the end of the columns will be blanked and the height of the display on the CRT is exactly the height of the vertical lamp columns.

FIG. 2 depicts the condition where the monitored parameter, for example aircraft speed, is slightly less than required. Thus, in FIG. 2 the intensifications or lines on the CRT lag behind the illuminated side indicators. It will become readily apparent to an observer viewing the FIG. 2 display that the controllable parameter, in this case aircraft speed, is lagging the optimum value and the natural reaction is to increase speed so that the horizontal raster on the CRT will "catch up" with the flashing side lamps.

As the requirement for corrective action increases, the discrepancy in the tracking of the lights by the CRT display will also become greater. Eventually, the height of the total raster display on the CRT will narrow. Finally, as in the limiting case of a stalled aircraft when vehicle speed is the monitored parameter, only the top raster on the CRT will be illuminated. Thus, in addition to the tracking discrepancy itself, the height or "band width" of the raster signals the magnitude of correction required. FIG. 3 represents a display which indicates a dangerously slow aircraft; i.e., an aircraft approaching the stall condition. One advantage of the narrowing of the "band width" as emergency conditions are approached is that viewing "through" the display becomes progressively easier. That is, the greater the emergency the more the CRT display is compressed to the top or bottom of the tube and the more of the central viewing area that is left clear.

FIG. 4 is a block diagram of a preferred embodiment of logic circuitry which may be employed to generate the displays of FIGS. 1–3 in accordance with the present invention. Considering the invention as being employed to display discrepancies in aircraft velocity, the inputs to the logic circuitry of FIG. 4 comprise pulse trains commensurate with actual and optimum velocity. These pulse trains will be generated by means well known in the art which do not comprise the present invention. For example, the vehicle velocity sensing means may comprise a standard tachometer type speed sensor and associated pulse generation circuitry. The means for providing a pulse train commensurate with optimum speed may be an International Business Machines, Model CP-2 navigation computer.

The optimal or desired velocity pulse train is used to count an optimal counter register 20 and to clock a shift register 46. The optimal velocity pulse train is also divided by the length of the shift register in a divider 44 to provide only a single "one" during the time required to shift every bit in the register 46 out the top. The output of the divider 44 provides a pulse train with only one pulse every time the shift register 46 is shifted a number of times equal to the number of bits in the register.

When the single "one" shifts out the high-order end of the register 46, considering the case where the actual velocity is lagging behind the optimal or commanded velocity, it is used as a pulse to help control a shift register 48 which is responsive to the actual velocity input pulse train. Under these circumstances, the optimal velocity lamps will appear to flip to the bottom of the columns of lamps and the actual velocity information as generated on the CRT must be caused to flip to the same relative position at the bottom of the display as it occupied at the top of the display relative to the optimal velocity indicator lamps.

The actual velocity pulse train has, under the examples situation being described, been counting the actual velocity count register 22 and clocking shifts in the associated shift register 48 for control of the raster lines on the cathode ray tube. When the control pulse is received from the optimal velocity register 46, if there is no "one" in the actual velocity shift register 48, a "one" will be entered in a position corresponding to the lowest position for the optimal shift register. Each register then shifts according to the rate of its input pulse train; each register showing a restore to the bottom of the screen commensurate with the state of the other register.

The two count registers 20 and 22 have a much higher order of magnitude (capacity) than can be handled by the optimal and actual velocity shift registers 46 and 48. Therefore, count registers serve to keep the instrument accurate even when the display has a limiting case.

The optimal shift register 46 is used to control a set of light drivers, not shown, which in turn drive the side display lamps on the sides of the CRT face. The actual velocity shift register 48 may be read into a display computer for presentation in raster form on the CRT screen. Alternatively, as shown in FIG. 4, the actual velocity shift register 48 may be connected to a digital to analogue converter 50 which, in turn, delivers a step voltage to a Y-driver amplifier 52 for the cathode ray tube. Horizontal sweep for the CRT may be accomplished through the use of a free-running sweep voltage generator 54.

Continuing with a consideration of FIG. 4, the optimal and actual velocity pulse trains are, as noted above, respectively applied to count registers 20 and 22. The count registers have parallel read-in and parallel read-out and may, for example, each comprise a plurality of four-bit binary counters such as Texas Instruments type SN 5493.

The outputs of the counters 20 and 22 are applied to a subtraction circuit 24. The subtraction function is accomplished by employing a digital parallel adder and sign control circuitry. Thus, subtraction is achieved by changing the sign of one of the input signals, as totalized in its associated counter, and thereafter adding the thus inverted signal to the count in the other count register. Sign information is gained by determining whether the negative or positive register has the greater magnitude stored therein. The subtractor 24 may, for example, comprise a plurality of four-bit full parallel adders such as Texas Instruments type SN 5483 and a plurality of four-bit complement, zero/one element circuits such as Texas Instruments type SN 541-187.

The comparison function performed by subtractor 24 is clocked by an OR gate 25 which is responsive to either of count registers 20 or 22 being counted to its capacity. The difference signal resulting from the comparison of the counts stored in registers 20 and 22 when a clocking signal is generated will be stored in difference register 26. Difference register 26 may be a standard logic register, identical to registers 20 and 22, having parallel read-in and read-out. Difference register 26 will detect both the magnitude and sign of the comparison performed by subtractor 24. As previously noted, the sign information is made available by comparing the relative magnitudes of the registers 20 and 22 by means of the subtract circuit 24.

A logic circuit or network connected to difference register 26 detects a "too large" or "overflow" condition from register 26 and employs that condition and the sign of the discrepancy to generate control signals which cause the display to "freeze" indicating maximum correction required. The generation of a "freeze" signal, in the manner to be described blow, also prevents the optimal and actual velocity shift registers 46 and 48 from counting while the dangerous condition persists. This logic network comprises a NAND gate 28, a pair of AND gates 30 and 32, OR gates 34 and 36 and an NOR gate 38. The sign information from register 26 is applied to a first input of AND gate 30 and has the input to NAND gate 28. Gate 28 merely serves as an inverter; AND gates 30 and 32 being respective to negative sign information and NAND gate 28 being responsive to positive sign information. The output of NAND gate 28 is applied to a first input of AND gate 34 and a negative enabling signal will thus be applied to gate 32 when a positive sign or error signal appears at the input to gate 28. The second inputs to AND gates 30 and 32 are connected to a preselected stage of register 26; this stage of register 26 being commensurate with an error or discrepancy having a magnitude which is considered commensurate with a difference between the actual and command inputs indicative of a dangerous departure of the monitored parameter from its computed optimum value. Accordingly, AND gate 30 will pass a signal to OR gate 34 when the difference is too large and negative whereas AND gate 32 will pass a signal to OR gate 36 when the discrepancy between the real and command inputs is too large and positive. The NOR gate 38 will provide an output signal, for the purposes to be described below, only when neither of OR gates 34 and 36 receives an input. Accordingly, NOR gate 38 will provide an enabling signal for a pair of AND gates 40 and 42 at all times except when the discrepancy between the real and optimum values of the monitored parameter becomes so excessive that a dangerous condition is being approached and the display should be altered so as to emphasize the warning.

It is to be noted that a function generator 60 and a lamp driver 62 are also connected to the output of OR gate 34 and are responsive to signals provided thereby. Accordingly, when OR gate 34 provides a signal commensurate with a discrepancy which is too large and negative, the bottom pair of lamps 14 will be energized, the raster will be frozen on the CRT at a point above the tops of the columns of lamps and there will be no further vertical movement of indicia on the display. Function generator 60 and lamp driver 62 will typically comprise circuitry which will cause the raster and lamps to flash while they are maintained in the "frozen" position. A "bottom raster" function generator 66 and a top lamp driver 64 are connected to the output of OR gate 36 and are responsive to signals provided thereby for indicating the opposite dangerous condition.

Before being applied to shift register 46 and count register 20, the optimal velocity pulse train will be transmitted through an AND gate 40. Similarly, before being applied to count register 22 and shift register 48, the actual velocity pulse train will be passed through an AND gate 42. Accordingly, as noted above, the shift registers and counters will be prevented from counting whenever a dangerous condition, as indicated by the appearance of a signal at the output of either of OR gates 34 or 36, exists.

While a preferred embodiment has been shown and described, various modifications and substitutions may be made thereto without departing from the spirit and scope of the present invention. For example, if it is desired to display the actual situation on the cathode ray tube, the display of the present invention may be superimposed thereover. Similarly, the present invention may be controlled so that the display fades when there is no discrepancy between the optimum and actual values of the monitored parameter. While the invention has been described in relation to a display which moves vertically, it would be within the capabilities of one skilled in the art to orient the present invention horizontally. Accordingly, it may be seen that the present invention has been described by way of illustration and not limitation.

What is claimed is:

1. A situational display apparatus for displaying a situation in the real world to a pilot of a pilot-operated aircraft comprising:

means for generating a first illuminated indicia which moves at a rate proportional to a desired state of a parameter affecting the real world situation, means for generating a second illuminated indicia, adjacent to said first indicia, which moves a rate proportional to the actual state of said parameter so that the second indicia tracks the first indicia where corrective action is unnecessary and leads or lags the first indicia when the actual state of the parameter differs from the desired state, one of said generating means comprising a plurality of sources of light which, when energized, constitute one of said indicia and which are oriented in parallel columns, and means for energizing pairs of said sources in stepwise manner to define a moving line transverse to said columns; and the other of said generating means comprising at least a portion of a cathode ray tube screen positioned intermediate said columns and providing a movable, substantially linear display parallel to said moving line which display constitutes the other of said indicia.

2. The apparatus of claim 1 further comprising means for freezing the display provided by the apparatus when the discrepancy between the actual and desired states of the parameter exceeds a predetermined level.

3. The apparatus of claim 1 wherein said sources comprise:

points on the cathode ray tube defining by intensification of an electron beam in the tube.

4. The apparatus of claim 1 wherein said sources comprise:

parallel arrays of individual lamps.

* * * * *